Oct. 14, 1924.

T. L. VALERIUS 1,511,644

ICE CREAM PACKAGING MACHINE

Filed Feb. 3, 1922     5 Sheets-Sheet 1

Oct. 14, 1924.

T. L. VALERIUS

ICE CREAM PACKAGING MACHINE

Filed Feb. 3, 1922

Witness
John E. Titus

Inventor
Theodore L. Valerius

Patented Oct. 14, 1924.

1,511,644

UNITED STATES PATENT OFFICE.

THEODORE L. VALERIUS, OF WAUKEGAN, ILLINOIS, ASSIGNOR TO CREAMERY PACKAGE MFG. COMPANY, OF CHICAGO, ILLINOIS, A CORPORATION OF ILLINOIS.

ICE-CREAM-PACKAGING MACHINE.

Application filed February 3, 1922. Serial No. 534,002.

*To all whom it may concern:*

Be it known that I, THEODORE L. VALERIUS, a citizen of the United States, residing at Waukegan, in the county of Lake and the State of Illinois, have invented certain new and useful Improvements in Ice-Cream-Packaging Machines, of which the following is a specification.

The invention relates to machines for packaging ice cream or the like in merchantable containers, more especially to the primary packing of ice cream in brick form, comprising one or more flavors, in cartons intended for distribution to the consuming trade.

In the production of the commercial "brick" of ice cream, it has been the usual practice, heretofore, to flow the ice cream in plastic condition from the freezers into slab moulds, then to harden the slabs by refrigeration, cut them into bricks, and manually wrap and pack the bricks in cartons.

It is highly desirable to avoid any unnecessary handling of ice cream between its manufacture and its delivery to the consumer, as such handling causes loss from shrinkage and damage to the quality of the product, and also is objectionable for sanitary considerations.

A further desirable element in obtaining satisfactory results in packaging ice cream bricks, is that the operation be done as near immediately after the initial freezing of the product as may be practicable, and without compressing the product in the packaging operation with the consequent considerable shrinkage therefrom.

The principal object of this invention is to provide an improved construction in a machine for primarily packing ice cream or the like in containers adapted in size and form for the consuming trade.

Another object is to provide in such a machine effective means for passing a series of containers of variable capacity in maintained abutting relation in successive position to receive and control a flowing discharge of plastic ice cream from a stationary reservoir, and to forward the filled containers in separated relation.

Another object is to provide a machine in which the flow from each of several compartments of a reservoir containing a variety of flavors, is regulated to maintain uniform simultaneous discharge into the passing containers.

Another object is to provide a machine of simple durable construction adapted for rapid effective operation, and readily kept in a sanitary condition.

Other objects and advantages will be apparent in the following description of a preferred embodiment of my invention, which I have illustrated in the accompanying drawings. It will be understood, however, that in the interpretation of the appended claims, they are not to be limited to the precise construction and arrangement set forth, except as may be necessitated by the state of the prior art.

In the accompanying drawings, Figs. 1ª and 1ᵇ represent side elevations of a machine embodying my invention, Fig. 1ᵇ representing that portion of the machine extending rearward of the portion represented in Fig. 1ª.

Figure 1:
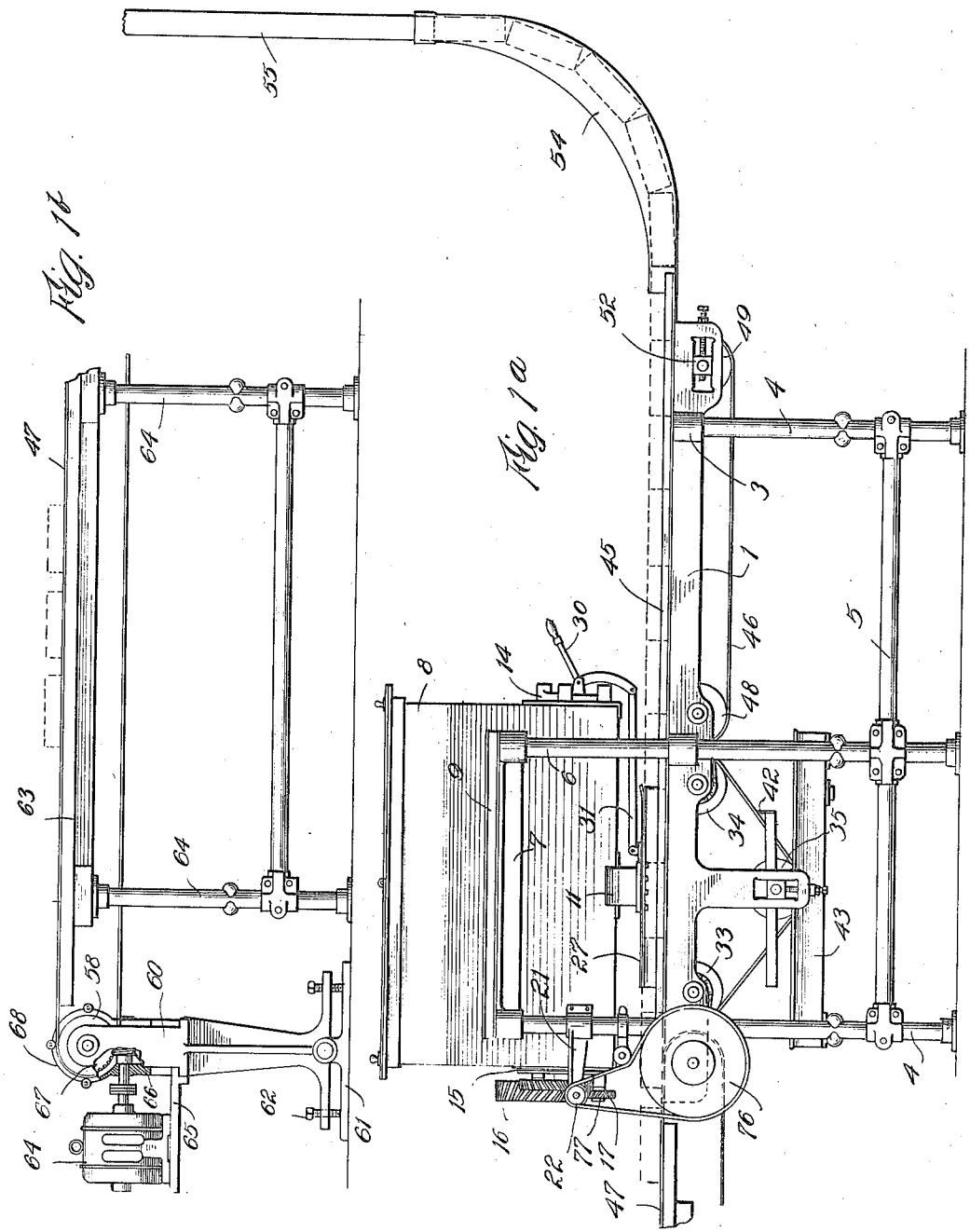
Figure 2:
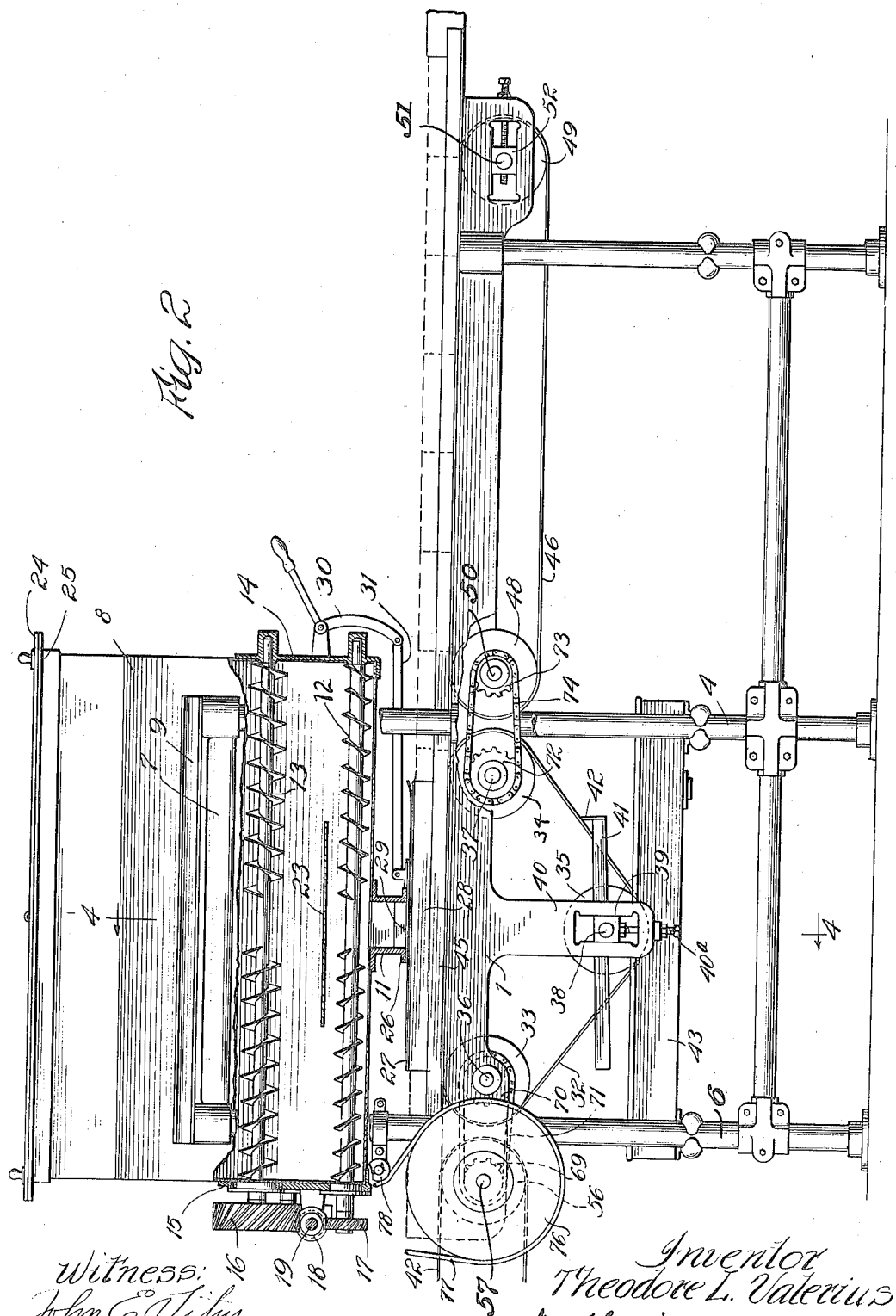
Fig. 2 is an enlarged side elevation of the main portion of the machine with sections of the reservoir and frame broken away to disclose certain of the operating parts.
Figure 3:
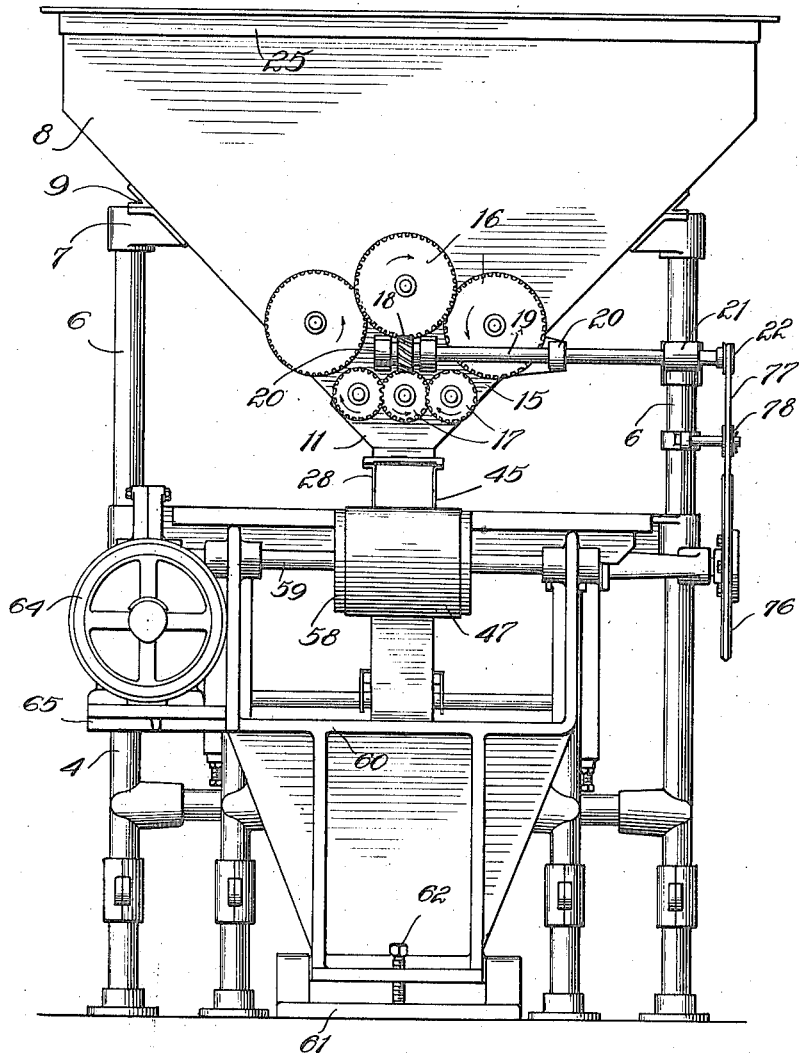
Fig. 3 is a rear end elevation.
Figure 4:
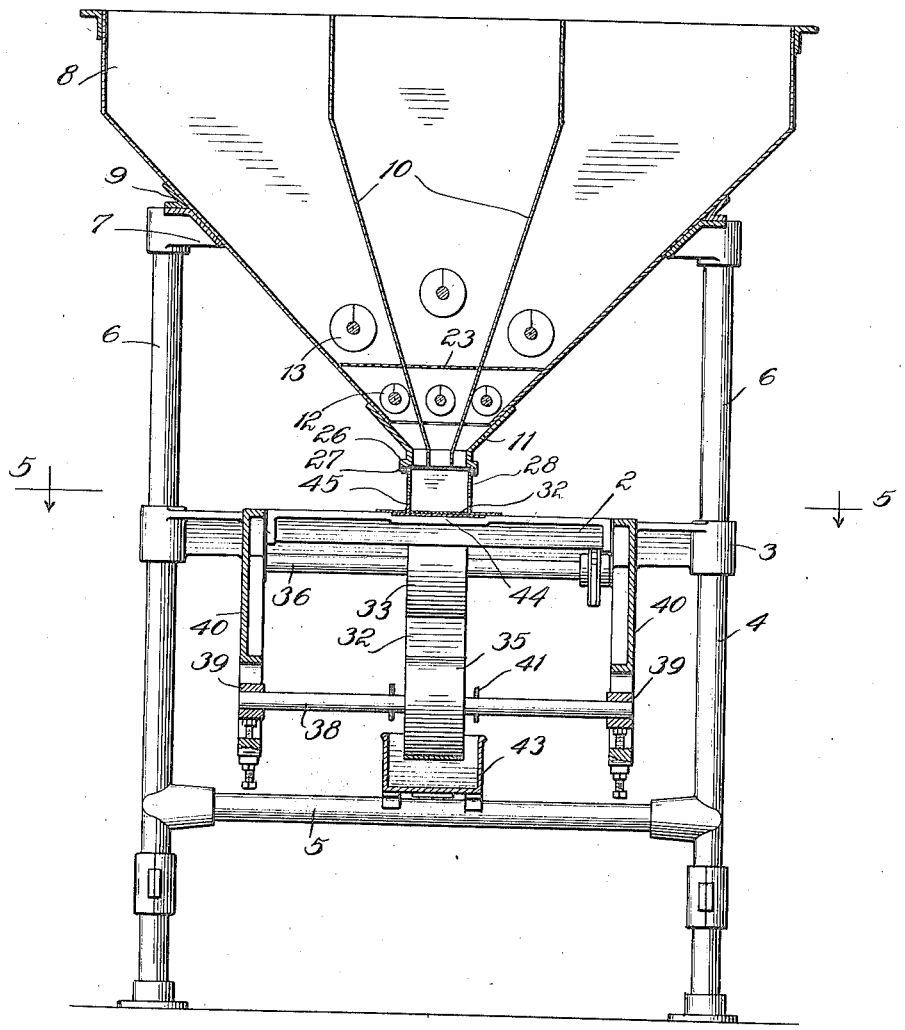
Fig. 4 is a cross sectional elevation taken on the plane of the line 4—4 in Fig. 2.
Figure 5:
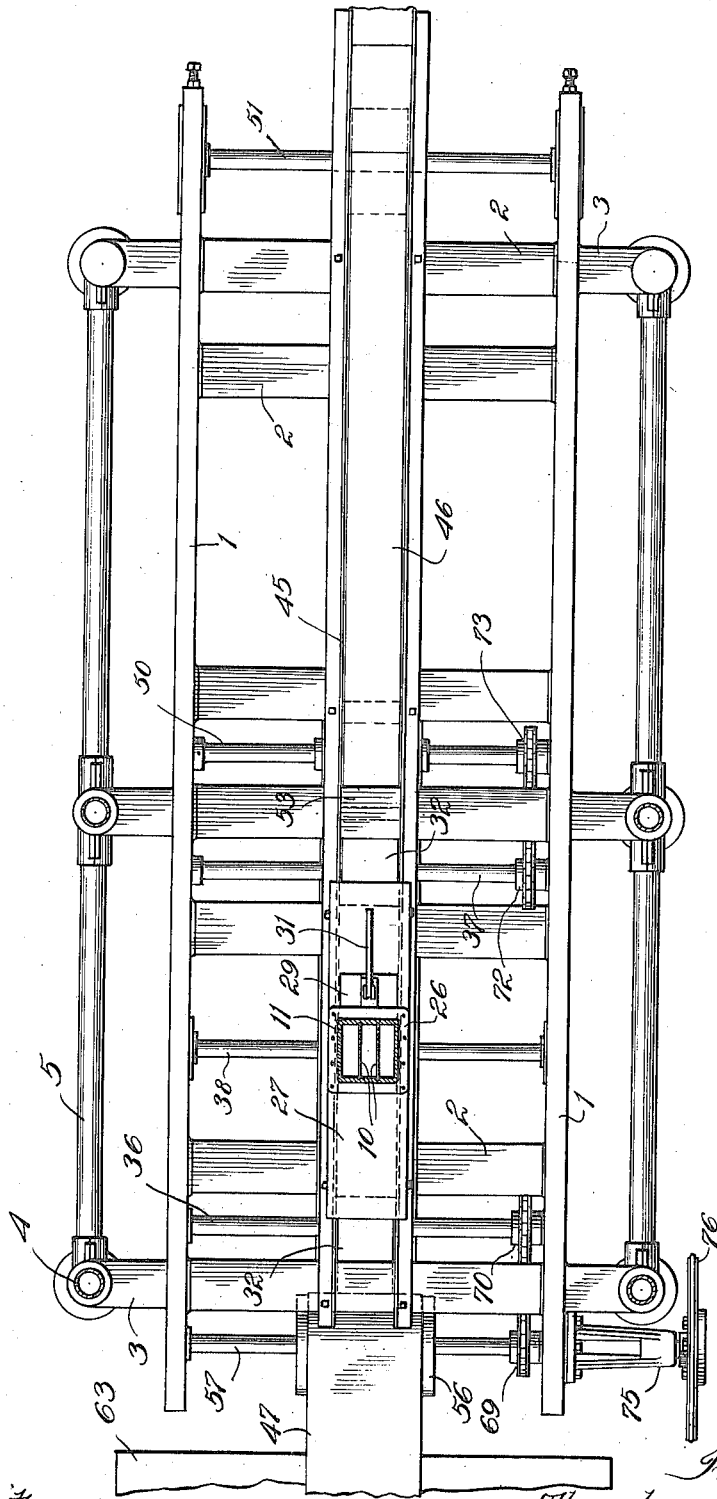
Fig. 5 is a sectional plan view taken on the plane of the line 5—5 in Fig. 4.

Referring to the drawings, a main supporting frame preferably comprises spaced side members 1, rigidly cross connected by a series of stretchers 2, and having lateral brackets 3 supported upon upright standards 4. Brace rods 5 may be secured between the lower portions of the standards.

Two opposite pairs of the standards 4 extend above the brackets 3, as at 6, each pair carrying a horizontal rail 7, having a laterally inclined inner bearing face, adapted to receive and support the convergently inclined side walls of a reservoir or tank 8. The latter also may be provided with an angle rail 9 secured to the reservoir and bearing upon the upper face of the rail 7.

The reservoir 8 preferably is constructed with a plurality of upwardly opening compartments of similar capacity formed by longitudinal partitions 10 extending from the open upper side of the reservoir to its bottom wall. The compartments thus formed are substantially wedge shaped with their narrow portions laterally adjoining at the bottom of the reservoir.

Upon the bottom of the reservoir, and preferably midway between its ends, is secured a casing 11 forming a discharge outlet communicating with each of the compartments of the reservoir. As illustrated herein, the throat of the casing 11 is rectangular in form, and those portions of the partition walls 10 which immediately overlie the casing are extended downwardly through the throat to form, with the side walls of the latter, three adjacent discharge orifices opening respectively into the three compartments of the reservoir.

By this arrangement of the compartments and the discharge orifices, differently flavored ice cream in the several compartments may flow therefrom in contiguous columns or layers. Upon filling the reservoir with ice cream in the usual plastic semi-frozen condition in which it is drawn from the freezers, the cream may flow by gravity through the several orifices, and thereupon be automatically controlled as hereinafter described to evenly fill a moving series of containers of quart, pint or other desirable sizes.

In order to facilitate the flow of the ice cream from the end portions of the reservoir compartments to the centrally located discharge orifices, longitudinally positioned worm conveyors may be provided in the lower portions of the compartments. In the present instance, each compartment is provided with two worms, a lower worm 12 and an upper worm 13 spaced somewhat above the lower worm. The worms are mounted respectively on suitable shafts extending through the end walls of the reservoir and supported in suitable bearing plates 14 and 15 mounted on the reservoir walls.

The ends of the worm shafts supported in the bearing plate 15 extend therethrough to receive driving gears mounted on the shaft ends. The upper group of worm shafts carry a series of intermeshing gears 16, and the lower group carry a similarly intermeshing series of gears 17. Between the center gears of each of the series, and in driving engagement therewith, is a worm gear 18 carried on a shaft 19 journaled in brackets 20 mounted on the end plate 15. For compactness of arrangement of the driving mechanism, the center one of the gears 16 is of substantially greater thickness than its laterally associated gears to permit passing the shaft 19 across the face of the latter and at the same time provide for operative engagement between the worm 18 and the central gear 16. The shaft 19 extends outwardly through a bearing in a bracket 21 mounted on one of the upright standards 6, and carries at its outer end a pulley 22.

The worm conveyors 12 and 13 may have their spiral blades pitched in each case to move the ice cream from both ends of the reservoir toward the center and over the discharge orifices, the blades being omitted for a portion of their mid-sections to permit the ready gravitation of the ice cream.

The operation of the worm conveyors, arranged as described above, effects uniform discharge of the cream from the entire length of the lower portions of the compartments and prevents the lodgment and delayed discharge of cream in the ends of the compartments with the consequent possibility of partial melting and uneven quality of the packaged product. The worms also prevent stoppage of the flow by the possible packing of the cream when too hard between the converging side walls of the compartments.

It may be desirable, although not necessary to successful operation, to provide a horizontal plate 23 in each of the compartments, positioned between the two worms and extending only through the central portions of the compartments. The plates 23 in conjunction with the side and bottom walls of the compartments form tubular chambers within which the worms 12 operate. The confining action of the plates upon the body of cream in the chambers promotes a more positive action of the lower worms in moving the cream toward the discharge orifices. In such case, the blades of the upper worms 13 are arranged to move the cream toward the ends of the reservoir where it gravitates upon the lower worms and is moved thereby into the chambers below the plates 23. The upper side of the reservoir may be closed by hinged covers 24 seated upon suitable marginal rails 25 secured about the edges of the reservoir walls.

A horizontal inverted chute preferably is mounted on the lower extremity of the casing 11, the latter being formed with an outer flange 26 to which is suitably secured a horizontal plate 27 forming the upper wall of the chute and having an orifice in register with the throat of the casing 11. A pair of lateral plates 28 secured to the upper plate 27, form the side walls of the chute.

A sliding gate 29 may be positioned above the plate 27, operable in suitable slideways provided in the flanged portion of the casing 11, and adapted to close the reservoir discharge orifices. The gate may be operated by a hand lever 30, pivotally mounted on the end of the reservoir, and operably connected to the sliding gate by a link 31.

Immediately below the horizontal chute there is provided container conveying means so arranged that the upper portions of the containers are passed through the chute, wherein they are filled with ice cream when passing the orifice in the plate 27.

The conveying means herein illustrated comprises an endless conveyor belt 32, operating over three supporting rollers 33, 34 and 35, with its upper run passing parallel to the longitudinal axis of the chute, and spaced from the upper wall 27 of the chute by the depth of an ice cream container or carton.

The two upper rollers 33 and 34 are carried on shafts 36 and 37 fixedly journaled at each end in the side members 1 of the main frame. The roller 35 is carried on a shaft 38 which may be journalled in bearing blocks 39 slidably supported in the vertically slotted brackets 40 extending downwardly from the frame members 1. The weight of the roller 35 and its shaft keeps the conveyor belt taut in operation. The belt tension may be made adjustable by mounting a screw threaded bolt 40a in the lower end of each of the brackets, the upper ends of the bolts being rotatably secured to the respective bearing blocks 39 whereby the latter may be raised or lowered as desired.

Provision may be made for removing such melted ice cream as may accidentally fall upon the belt, comprising a pair of bars 41 pivoted on the shaft 38 on each side of the roller 35, and carrying between them a resilient strap or squeegee 42, the bars being over balanced at the opposite ends so that the squeegee bears upon the under run of the belt. A pan 43 may be supported upon a pair of the brace rods 5, in position below the squeegee to receive such drip as may be thus removed from the belt.

The position of the upper belt run in relation to the chute may be preserved by means of an under supporting plate 44, mounted on the stretchers 2 between the rollers 33 and 34, and forming a rigid rest along which the upper belt run travels. Lateral guide rails 45 may be associated with the plate 44, to prevent lateral displacement of the conveyor belt, and also to guide the cartons in their movement to and from the chute.

For the handling of the cartons to and from the upper run of the conveyor belt 32, I have provided a second conveyor belt 46 for delivering empty cartons to the belt 32, and a third conveyor belt 47 for receiving the filled cartons. The second belt 46 operates over supporting rollers 48 and 49 carried respectively by shafts 50 and 51. The shaft 50 is fixedly journaled in the frame members 1 in parallel relation to the shaft 37, and positioned so that the roller 48 is adjacent the roller 34 with the upper run of the belt 46 at substantially the same level of the upper run of the belt 32, in end to end relation. The shaft 51, also supported in the frame members 1, may be journalled in horizontally adjustable sliding bearing blocks 52 mounted in the frame members similarly to the bearing blocks 39, and enabling the adjustment of the tension in the belt 46. The belt 46 is preferably of the same width as the belt 32, and the lateral guide rails 45 extended continuously through to the end of the former. A bridge plate 53 may be mounted on the underside of the guide rails in the gap between the belts to support the cartons in their passage from one belt to the other.

For the delivery of cartons to the conveyor belt 46, there may be provided a curved conduit 54 having one end positioned to discharge the cartons upon the upper run of the belt, and the other end connected with an upright extension 55 leading to an elevated filling station. The conduit may be supported by overhead suspension.

The receiving conveyor belt 47 operates over a roller 56 mounted on a shaft 57 journaled in the frame members 1 in parallel relation to the shaft 36, and positioned so that the upper run of the belt 47 is in end to end relation to and substantially at the same level with the upper run of the belt 32. The belt 47, is outwardly supported upon a roller 58 mounted on a shaft 59 preferably journaled in an independent standard 60. The latter may be constructed to rock upon a transverse axis, being pivotally supported upon its base 61, and having adjusting screws 62 mounted in oppositely positioned flanges on the standard with their ends bearing upon the base. The standard may be thus tilted on its base to secure the desired tension in the belt 47.

Between the standard 60 and the main frame of the machine, there is preferably placed a table 63 suitably supported by upright legs 64, the top of the table being of suitable height to underlie and support the upper run of the belt 47. The table 63 is constructed of sufficient width to provide substantial working space on both sides of the belt 47.

As illustrated herein, the several conveyor belts are primarily driven by electric motor 64 mounted on a bracket 65 extending laterally from the standard 60. The motor shaft is appropriately connected with a worm 66 journaled in the standard 60, the worm being in driving engagement with a worm gear 67 fixed on the roller shaft 59, the worm and gear being provided with a suitable housing 68.

Power may be thus transmitted through the belt 47 to the roller 56 and shaft 57. A sprocket 69 fixed on the shaft 57 drives a sprocket 70 fixed on the shaft 36 by means of the chain 71, thereby driving the belt 32.

Similarly a pair of sprockets 72 and 73, mounted respectively on the shafts 37 and 50 and interconnected by the chain 74, serve to drive the belt 46. An extension of the shaft 57, outwardly journaled in a bracket 75 mounted on the main frame, carries a driving pulley 76 having a belt connection 77 with the pulley 22 for the operation of the worms within the reservoir. A tensioning idler 78 may be provided with an adjustable support on the upright 6.

The relative diameters of the driving sprockets in the two pairs described, are such that the center belt 32 travels at a substantially slower speed than either of the other two belts, thereby accomplishing an important feature of the invention more fully described hereinafter.

The cartons employed may be of any suitable construction and material, of box-like form with the upper side open, and adapted to receive a suitable cover after being filled. They should be of uniform depth and width, but may be varied as to length to contain any desired quantity of ice cream, usually of quart and pint measure.

Upon being introduced end to end in the conduit 55, the cartons travel downward by gravity and out upon the conveyor 46. The weight of the cartons in the upright conduit causes them to be fed out upon the belt in a continuous series in end to end contact. The belt 46 carries the cartons forward to the slower belt 32, and the latter carries them into the filling chute, the movement of the cartons on both belts being laterally guided by the side rails 45.

The depth of the cartons is such that as they enter the chute, the upper edges of the side and end walls of the carton slidingly engage the underside of the plate 27, the side plates 28 preventing lateral displacement of the side walls.

As the cartons are propelled by the conveyor 32 into register with the opening in the plate 27 communicating through the casing 11 with the discharge orifices of the several ice cream compartments, the ice cream flows into the successive cartons while this movement continues, and at a rate sufficient to entirely fill each carton before it passes out of register. When a carton is completely filled, the flow of ice cream is automatically checked or diverted to the next succeeding carton, by reason of the seal against overflow accomplished by the snug engagement between the upper edges of the carton walls with the upper wall of the chute. The latter is of sufficient length so that the open cartons are always sealed thereby so long as any portion of the carton is in register with the filling orifice. The relation of constant end to end contact between the cartons prevents the loss or overflow of ice cream over their end walls or between the cartons when passing the filling orifice.

It will here be obvious that assured maintenance of the end to end contact between the successive cartons, while passing through the filling chute, is important. The slower rate of speed of the center belt 32 accomplished that purpose by retarding the movement of the cartons and causing those following on the faster belt 46 to be crowded against them and each other. The weight of the filled cartons and the frictional resistance of the chute causes most of the consequent slippage between the two belts and the series of cartons to occur on the belt 46, whereby any gaps, which for any reason may exist between the cartons, are quickly taken up by the relatively faster movement of the free cartons resting on the belt 46.

By reason of the arrangement of the several compartment discharge orifices within the casing 11 in longitudinally parallel relation to the direction of movement of the cartons, and with their total width approximately equal to the width of the carton, it will be apparent that the flow of ice cream from the several orifices will equally and simultaneously fill the portions of the cartons immediately in register with the respective orifices, and thus preserve a well defined division between the several layers of different flavor. On account of their vertical arrangement the layers are discernible at the top of the uncovered carton, and disclose the contents of the package upon subsequent inspection.

As the filled cartons are carried out of the filling chute, they are discharged upon the belt 47, operating at a higher speed than the belt 32. In consequence of the increased belt speed, each carton as received is carried away from its successor for a substantial distance, and the separated series is forwarded over the table 63. The separated relation of the cartons enables attendants stationed at the sides of the table to quickly place covers upon the cartons as they rest on the belt, and thereafter remove them from the belt without touching the open filled cartons nor their contents, an obviously desirable sanitary accomplishment. The complete packages may thereafter be transferred to a low temperature hardening room for the completion of the freezing of the ice cream bricks.

It will now be apparent that I have provided an improved machine of simple durable construction, adapted to accomplish the expeditious, efficient and sanitary packaging of ice cream.

I claim as my invention:

1. In a machine of the class described, an ice cream supply reservoir having a discharge orifice, and means for conveying a series of inter-abutting containers successively into register with said orifice, said means comprising a pair of associated frictional conveyors operating in alinement at different speeds, the slower one of said conveyors being adapted to carry said containers into register with said orifice, and the faster one of said conveyors being adapted to deliver said containers successively upon said slower conveyor and maintain said containers in inter-abutting serial relation upon the latter.

2. In a machine of the class described, an ice cream supply reservoir having a discharge orifice, and means for conveying a series of inter-abutting containers successively into register with said orifice, said means comprising a pair of associated conveyors operating in alinement at different speeds, the slower one of said conveyors being adapted to carry said containers into register with said orifice, and the faster one of said conveyors being adapted to deliver said containers successively upon said slower conveyor, and a conduit adapted to deliver containers by gravity in abutting relation to the faster one of said conveyors.

3. In a machine of the class described, an ice cream supply reservoir having a discharge orifice, a belt conveyor adapted to carry containers to and from said orifice for filling, and a member having transverse resilient contact with the carrying surface of said belt adapted to remove liquid accumulations therefrom.

4. In a machine of the class described, an ice cream supply reservoir having a discharge orifice, an endless belt operable to convey containers to and from said orifice to be filled therefrom, a pivoted support positioned adjacent to the return run of said belt, and a strip of resilient material carried by said support normally having contact transversely of the surface of said belt, said support being resiliently actuated to swing on its pivot and maintain such contact.

5. In a machine of the class described, an ice cream supply reservoir having a discharge orifice, and means for conveying a series of containers successively to and from register with said orifice, said means comprising three alined frictional conveyors of which the center one is associated with said orifice and operable at slower speed than the end conveyors, one of said end conveyors being operable to deliver and maintain said containers in inter-abutting relation upon said center conveyor, and the other of said conveyors being operable to receive and separate said containers from said center conveyor.

In witness whereof I have hereunto set my hand.

THEODORE L. VALERIUS.